(12) United States Patent
Peera et al.

(10) Patent No.: US 12,122,983 B2
(45) Date of Patent: *Oct. 22, 2024

(54) CLEANING BOOSTER

(71) Applicants: Dow Global Technologies LLC, Midland, MI (US); Rohm and Haas Company, Collegeville, PA (US)

(72) Inventors: Asghar A. Peera, Royersford, PA (US); Michael L Tulchinsky, Midland, MI (US); Stephen J. Donovan, Sellersville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 698 days.

This patent is subject to a terminal disclaimer.

(21) Appl. No.: 17/294,745

(22) PCT Filed: Dec. 5, 2019

(86) PCT No.: PCT/US2019/064576
§ 371 (c)(1),
(2) Date: May 18, 2021

(87) PCT Pub. No.: WO2020/123239
PCT Pub. Date: Jun. 18, 2020

(65) Prior Publication Data
US 2022/0017841 A1  Jan. 20, 2022

Related U.S. Application Data

(60) Provisional application No. 62/779,048, filed on Dec. 13, 2018.

(51) Int. Cl.
C11D 3/37 (2006.01)
C08G 65/26 (2006.01)
C11D 3/00 (2006.01)
C11D 11/00 (2006.01)

(52) U.S. Cl.
CPC ........ *C11D 3/3707* (2013.01); *C08G 65/2627* (2013.01); *C11D 3/0036* (2013.01); *C11D 2111/12* (2024.01)

(58) Field of Classification Search
CPC .. C11D 3/3703; C11D 3/0036; C11D 11/0017
See application file for complete search history.

(56) References Cited

U.S. PATENT DOCUMENTS

| 2,683,730 | A | | 7/1954 | Seeger et al. | |
|---|---|---|---|---|---|
| 3,293,297 | A | | 12/1966 | Name | |
| 3,499,009 | A | * | 3/1970 | Reymore, Jr. | C08G 18/667 528/308 |
| 4,588,840 | A | * | 5/1986 | Gurgiolo | C07C 217/84 564/443 |
| 8,759,276 | B2 | | 6/2014 | Man et al. | |
| 9,529,294 | B2 | | 12/2016 | Heilman et al. | |
| 9,605,163 | B2 | | 3/2017 | Peera et al. | |
| 10,808,206 | B2 | * | 10/2020 | Pelletier | C11D 3/3715 |
| 2004/0068051 | A1 | | 4/2004 | Ortiz et al. | |
| 2009/0005288 | A1 | | 1/2009 | Boutique | |
| 2010/0235776 | A1 | | 9/2010 | Brown | |
| 2015/0091009 | A1 | | 4/2015 | Yamazaki et al. | |
| 2015/0148890 | A1 | | 5/2015 | Hartley et al. | |
| 2015/0329479 | A1 | | 11/2015 | Jieping | |
| 2018/0119291 | A1 | | 5/2018 | Hueffer et al. | |
| 2022/0002638 | A1 | * | 1/2022 | Peera | C11D 3/30 |
| 2022/0017841 | A1 | * | 1/2022 | Peera | C11D 3/3707 |

FOREIGN PATENT DOCUMENTS

| CN | 107417904 | | 12/2017 | |
|---|---|---|---|---|
| JP | 2004027181 | | 1/2004 | |
| JP | 2006096741 | | 4/2006 | |
| WO | 2018072979 | | 4/2018 | |
| WO | WO-2018072979 | A1 * | 4/2018 | ......... C08G 65/2612 |
| WO | 2020123240 | | 6/2020 | |

OTHER PUBLICATIONS

Macduff Okuom et al. Int J Org Chem (Irvine). Dec. 2013; 3(4): 256-261. (Year: 2013).*
He., "Interfacial sciences in unconventional petroleum production: from fundamentals to applications." Chem. Soc. Rev. 2015, p. 5478-5480, vol. 44.
Search Report from corresponding Japanese Application No. 2021-531114 dated Aug. 4, 2023.

* cited by examiner

Primary Examiner — Liam J Heincer
Assistant Examiner — M. Reza Asdjodi
(74) Attorney, Agent, or Firm — Thomas S. Deibert

(57) ABSTRACT

A liquid laundry additive is provided, comprising a cleaning booster, wherein the cleaning booster is of formula (I), wherein $R^1$ is a $C_{1-4}$ alkylidene group; wherein each occurrence of $R^2$ is independently selected from a $C_{2-5}$ alkylene oxide group; and wherein the sum v+x+y+z is >40.

16 Claims, No Drawings

CLEANING BOOSTER

The present invention relates to a liquid laundry additive. In particular, the present invention relates to a liquid laundry additive, comprising a cleaning booster, wherein the cleaning booster is of formula (I), wherein $R^1$ is a $C_{1-4}$ alkylidene group; wherein each occurrence of $R^2$ is independently selected from a $C_{2-5}$ alkylene oxide group; and wherein the sum v+x+y+z is >40.

Laundry detergents in liquid and gel forms providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One approach for reducing the unit dose of surfactant is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for liquid laundry additives that facilitate maintained primary cleaning performance with reduced surfactant loading in liquid or gel laundry detergent formulations; preferably, while also providing improved anti-redeposition performance.

The present invention provides a liquid laundry additive, comprising a cleaning booster, wherein the cleaning booster is of formula (I)

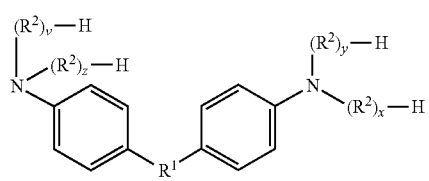

(I)

wherein $R^1$ is a $C_{1-4}$ alkylidene group; wherein each occurrence of $R^2$ is independently selected from a $C_{2-5}$ alkylene oxide group; and wherein the sum v+x+y+z is >40.

The present invention provides a liquid laundry additive, comprising water and a cleaning booster, wherein the cleaning booster is of formula (I)

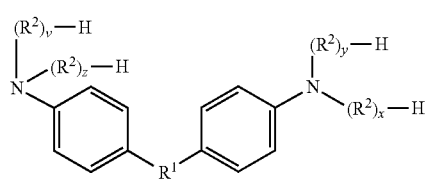

(I)

wherein $R^1$ is a $C_{1-4}$ alkylidene group; wherein each occurrence of $R^2$ is independently selected from a $C_2$-5 alkylene oxide group; and wherein the sum v+x+y+z is >40; and wherein the cleaning booster is dispersed in the water.

The present invention provides a liquid laundry additive, comprising water and a cleaning booster, wherein the cleaning booster is of formula (II)

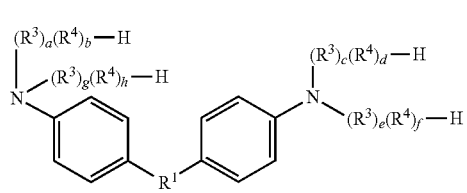

(II)

wherein $R^1$ is a $C_{1-4}$ alkylidene group; wherein each $R^3$ is a propylene oxide group; wherein each $R^4$ is an ethylene oxide group; wherein the sum a+c+e+g is 0 to 200; wherein the sum b+d+f+h is 0 to 200; wherein the sum a+b+c+d+e+f+g+h is 60 to 400; and wherein the cleaning booster is dispersed in the water.

The present invention provides a liquid laundry additive, comprising water and a cleaning booster, wherein the cleaning booster is of formula (III)

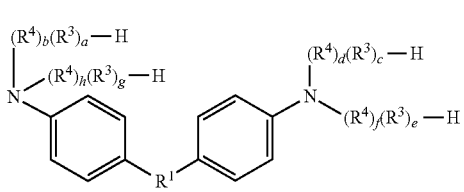

(III)

wherein $R^1$ is a $C_{1-4}$ alkylidene group; wherein each $R^3$ is a propylene oxide group; wherein each $R^4$ is an ethylene oxide group; wherein the sum a+c+e+g is 0 to 200; wherein the sum b+d+f+h is 0 to 200; wherein the sum a+b+c+d+e+f+g+h is 60 to 400; and wherein the cleaning booster is dispersed in the water.

DETAILED DESCRIPTION

It has been surprisingly found that the liquid laundry additive as described herein facilitates maintained primary cleaning performance in liquid or gel laundry detergent formulations (enabling reduced surfactant loading) while also providing a significant improvement in anti-redeposition performance over conventional laundry additives.

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modern Size Exclusion Liquid Chromatography: Practice of Gel Permeation and Gel Filtration Chromatography, Second Edition, Striegel, et al., John Wiley & Sons, 2009. Weight average molecular weights are reported herein in units of Daltons.

Preferably, the liquid laundry additive of the present invention, comprises a cleaning booster as described herein. More preferably, the liquid laundry additive of the present invention, comprises: water and a cleaning booster as described herein; wherein the cleaning booster is dispersed in the water. Most preferably, the liquid laundry additive of the present invention, comprises: 5 to 85 wt % (preferably, 20 to 80 wt %; more preferably, 30 to 75 wt %; most preferably, 40 to 60 wt %) water and 15 to 95 wt % (preferably, 20 to 80 wt %; more preferably, 25 to 70 wt %; most preferably, 40 to 60 wt %) of a cleaning booster as described herein.

Preferably, the cleaning booster is of formula (I)

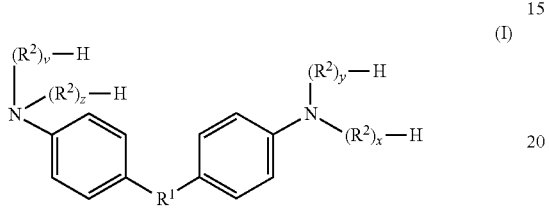

(I)

wherein $R^1$ is a $C_{1-4}$ alkylidene group (e.g., —CH—; —CH(CH$_3$)—; —CH(C$_2$H$_5$)—; —C(CH$_3$)$_2$—) (preferably, a $C_{1-3}$ alkylidene group; more preferably, a $C_{1-2}$ alkylidene group; most preferably, a methylene group); wherein each occurrence of $R^2$ is independently selected from a $C_{2-5}$ alkylene oxide group (preferably, an ethylene oxide group, a propylene oxide group and a butylene oxide group; more preferably, an ethylene oxide group and a propylene oxide group); and wherein the sum v+x+y+z is >40 (preferably, 44 to 1,000; more preferably, 52 to 752; still more preferably, 60 to 400; yet more preferably, 72 to 200; most preferably, 80 to 160).

Preferably, the cleaning booster has a weight average molecular weight of 370 to 93,200 Daltons (preferably, 500 to 60,000 Daltons; more preferably, 2,000 to 44,000 Daltons; still more preferably, 3,000 to 23,500 Daltons; yet more preferably, 3,500 to 12,000 Daltons; most preferably, 4,000 to 9,500 Daltons).

Preferably, the primary cleaning booster is of formula (I), wherein each occurrence of $R^2$ is independently selected from an ethylene oxide group, a propylene oxide group and a butylene oxide group; and wherein the cleaning booster has a weight average molecular weight of 370 to 93,200 Daltons (preferably, 500 to 60,000 Daltons; more preferably, 2,000 to 44,000 Daltons; still more preferably, 3,000 to 23,500 Daltons; yet more preferably, 3,500 to 12,000 Daltons; most preferably, 4,000 to 9,500 Daltons).

Preferably, the cleaning booster is of formula (II)

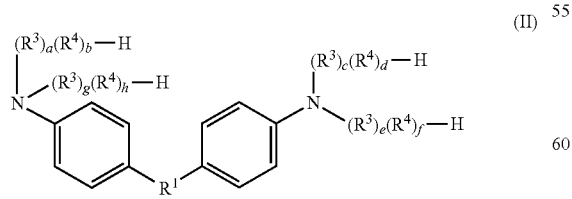

(II)

wherein $R^1$ is a $C_{1-4}$ alkylidene group (preferably, a $C_{1-3}$ alkylidene group; more preferably, a $C_{1-2}$ alkylidene group; most preferably, a methylene group); wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); and wherein the sum a+b+c+d+e+f+g+h is >40 to 400 (preferably, 44 to 400; more preferably, 52 to 400; still more preferably, 60 to 400; yet more preferably, 72 to 200; most preferably, 80 to 160). More preferably, the cleaning booster is of formula (II), wherein $R^1$ is a methylene group; wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); wherein the sum a+b+c+d+e+f+g+h is >40 to 400 (preferably, 44 to 400; more preferably, 52 to 400; still more preferably, 60 to 400; yet more preferably, 72 to 200; most preferably, 80 to 160); and wherein the cleaning booster has a weight average molecular weight of 4,000 to 9,500 Daltons. Most preferably, the cleaning booster is of formula (II), wherein $R^1$ is a methylene group; wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); wherein the sum a+b+c+d+e+f+g+h is >40 to 400 (preferably, 44 to 400; more preferably, 52 to 400; still more preferably, 60 to 400; yet more preferably, 72 to 200; most preferably, 80 to 160); wherein the cleaning booster has a weight average molecular weight of 4,000 to 9,500 Daltons; and wherein the weight ratio of propylene oxide groups to ethylene oxide groups in the cleaning booster is 0.25 to 3 (preferably, 0.5 to 2.75; more preferably, 0.75 to 2.5; most preferably, 1.0 to 2.25).

Preferably, the cleaning booster is of formula (III)

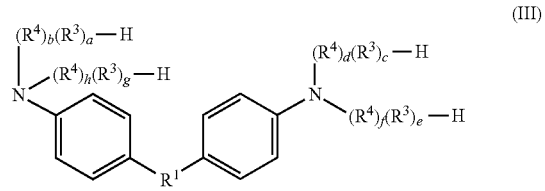

(III)

wherein $R^1$ is a $C_{1-4}$ alkylidene group (preferably, a $C_{1-3}$ alkylidene group; more preferably, a $C_{1-2}$ alkylidene group; most preferably, a methylene group); wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); and wherein the sum a+b+c+d+e+f+g+h is >40 to 400 (preferably, 44 to 400; more preferably, 52 to 400; still more preferably, 60 to 400; yet more preferably, 72 to 200; most preferably, 80 to 160). More preferably, the cleaning booster is of formula (III), wherein $R^1$ is a methylene group; wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); wherein the sum a+b+c+d+e+f+g+h is >40 to 400 (preferably, 44 to 400; more preferably, 52 to 400; still more preferably, 60 to 400; yet more preferably, 72 to 200; most preferably, 80 to 160); and wherein the cleaning booster has a weight average molecular weight of 4,000 to 9,500 Daltons. Most preferably, the cleaning booster is of formula (III), wherein $R^1$ is a methylene group; wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); wherein the sum a+b+c+d+e+f+g+h is >40 to 400 (preferably, 44 to 400; more preferably, 52 to 400; still more preferably, 60 to 400; yet more preferably, 72 to 200; most preferably, 80 to 160); wherein the cleaning booster has a weight average molecular weight of 4,000 to 9,500 Daltons; and wherein the weight ratio of propylene oxide groups to ethylene oxide groups in the cleaning booster is 0.25 to 3 (preferably, 0.5 to 2.75; more preferably, 0.75 to 2.5; most preferably, 1.0 to 2.25).

Some embodiments of the present invention will now be described in detail in the following Examples.

Synthesis Q1-Q2: Cleaning Booster

Synthesis Q1-Q2 were carried out in a Symyx PPR® setup containing 48 reactors. Each reactor was equipped with a glass insert and a removable PEEK stir paddle. A glass insert along with a removable PEEK stir paddle for each cell were dried in a vacuum oven at 125° C. The propylene oxide and ethylene oxide used in the synthesis were delivered to the reactor via an ISCO syringe pump equipped with a robotically controlled needle and compressed gas micro valve.

Each of 16 reactors was then charged with 4,4'-methylenedianiline (PMDA) (1.98 g) under nitrogen. The reactors were then sealed and charged with propylene oxide (PO) (2.32 g). The temperature set point for the reactors was then set to 140° C. and the reactor contents were stirred for 24 hours after reaching temperature. The heat source was then removed and the reactors were then cooled, vented and purged with nitrogen to remove any residual propylene oxide from the reactors providing a PMDA-PO$_4$ starter. The contents from the 16 reactors was combined and a small sample was then taken for NMR analysis.

The PMDA-PO$_4$ starter (10 g) was mixed with a calculated amount of 50 wt % KOH solution in a round bottom flask to make 20 wt % KOH mixture relative to the starter. Then 100 to 150 mL of toluene was added and water was removed azeotropically at 110° C. using a Dean-Stark trap. The remaining toluene was evaporated in vacuum. The dry starter containing the KOH catalyst was weighed into glass inserts in the amounts indicated in TABLE 1. The glass inserts along with the stir paddles were loaded to the corresponding PPR wells and the reactors were sealed. The cells were charged by robot with calculated amounts of propylene oxide (PO) shown in TABLE 1. The temperature was increased to 115° C. and the reaction mixtures were stirred for 48 hours after reaching process temperature. The pressure in the reactors gradually leveled off, indicating that the reactions were completed. The cells were cooled, vented and purged with nitrogen to remove any residual PO.

The reactor contents were then heated to 50° C. and ethylene oxide (EO) was added in the amount noted in TABLE 1. The temperature set point for the reactor was then set to 130° C. and the reactor contents were stirred for 4 hours after reaching temperature. The heat source was then removed and the reactor was cooled, vented and purged with nitrogen to provide the product cleaning boosters. The number average and weight average molecular weights of the product cleaning boosters measured by gel permeation chromatography are provided in TABLE 1.

TABLE 1

| Example | PMDA-PO$_4$ | PO (g) | EO (g) | Molecular weight (Daltons) | |
|---|---|---|---|---|---|
| | | | | $M_n$ | $M_w$ |
| Synthesis Q1 | 0.27 | 2.88 | 1.44 | 7,639 | 7,874 |
| Synthesis Q2 | 0.27 | 2.18 | 2.18 | 7,412 | 7,684 |

Comparative Examples $C_1$-$C_2$ and Examples 1-2: Liquid Laundry Detergent

The liquid laundry detergent formulations used in the cleaning tests in the subsequent Examples were prepared having the generic formulation as described in TABLE 2 with the cleaning booster as noted in TABLE 3 and were prepared by standard liquid laundry formulation preparation procedures.

TABLE 2

| Ingredient | Commercial Name | wt % |
|---|---|---|
| Linear alkyl benzene sulfonate | Nacconal 90G* | 12.0 |
| Sodium lauryl ethoxysulfate | Steol CS-460* | 2.0 |
| Cleaning Booster | — | 3.0 |
| Deionized water | — | QS to 100 |

*available from Stepan Company

TABLE 3

| Example | Cleaning Booster |
|---|---|
| Comparative Example C1 | poly(acrylic acid)[1] |
| Comparative Example C2 | ethoxylated poly(ethyleneimine)[2] |
| Example 1 | product of Synthesis Q1 |
| Example 2 | product of Synthesis Q2 |

[1] available from The Dow Chemical Company under the tradename Acusol™ 445
[2] available from BASF under the tradename Sokolan™ HP-20

Anti-Redeposition

The anti-redeposition performance of the Liquid laundry detergent formulations of Comparative Examples $C_1$-$C_2$ and Examples 1-2 were assessed in a Terg-o-tometer Model 7243ES agitated at 90 cycles per minute with the conditions noted in TABLE 4.

TABLE 4

| Parameter | Setting |
| --- | --- |
| Temperature | 25° C. |
| Water hardness | 300 ppm, Ca/Mg = 2/1 |
| Fabric Types | Cotton Terry (CT) |
| | Cotton (C) |
| | Polyester: cotton blend (PB) |
| | Cotton interlock (CI) |
| Wash time | 60 minutes |
| Rinse time | 3 minutes |
| Liquid laundry detergent dosage | 0.5 g/L |
| Anti-redeposition soils | 0.625 g/L Big Oak Clay (sourced locally from southeastern Pennsylvania) 2.5 g/L Body Sebum Emulsion (Scientific Services S/D Inc.) |

The fabrics were laundered for 5 consecutive cycles and the whiteness index was measured at 460 nm using a HunderLab UltraScan VIS Colorimeter to determine fabric whiteness in accordance with ASTM E313. The whiteness index for the neat unwashed fabrics was used as the positive control. The change in the whiteness index relative to the positive control for each of the liquid laundry formulations are provided in TABLE 5.

TABLE 5

| | Delta in Whiteness Index | | | |
| --- | --- | --- | --- | --- |
| Ex. | CT | C | PB | CI |
| Comparative Example C1 | 71.75 | 15.81 | 23.86 | 34.9 |
| Comparative Example C2 | 92.57 | 23.17 | 28.14 | 46.48 |
| Example 1 | 25.40 | 4.12 | 18.05 | 4.13 |
| Example 2 | 26.15 | 4.91 | 19.93 | 4.26 |

We claim:

1. A liquid laundry additive, comprising a cleaning booster, wherein the cleaning booster is of formula (I)

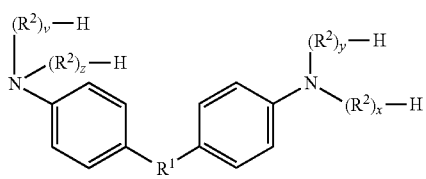

(I)

wherein $R^1$ is a $C_{1-4}$ alkylidene group;
wherein each occurrence of $R^2$ is independently selected from a $C_{2-5}$ alkylene oxide group; and
wherein the sum v++x+y+z is >40.

2. The liquid laundry additive of claim 1, further comprising water; wherein the cleaning booster is dispersed in the water.

3. The liquid laundry additive of claim 2, wherein each occurrence of $R^2$ is independently selected from an ethylene oxide group, a propylene oxide group and a butylene oxide group.

4. The liquid laundry additive claim 3, wherein the cleaning booster is of formula (II)

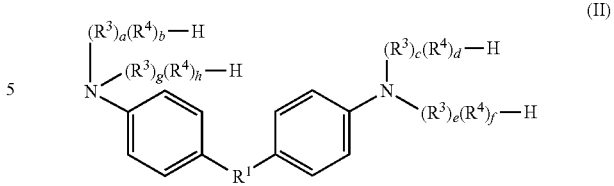

(II)

wherein $R^1$ is a $C_{1-4}$ alkylidene group;
wherein each $R^3$ is a propylene oxide group;
wherein each $R^4$ is an ethylene oxide group;
wherein the sum a+c+e+g is 0 to 200;
wherein the sum b+d+f+h is 0 to 200; and
wherein the sum a+b+c+d+e+f+g+h is 60 to 400.

5. The liquid laundry additive of claim 4, wherein $R^1$ is a methylene group.

6. The liquid laundry additive of claim 5, wherein the cleaning booster has a weight average molecular weight of 4,000 to 9,500 Daltons.

7. The liquid laundry additive of claim 5, wherein the weight ratio of the propylene oxide groups to the ethylene oxide groups in the cleaning booster is 0.25 to 3.

8. The liquid laundry additive of claim 7, wherein the weight ratio of the propylene oxide groups to the ethylene oxide groups in the cleaning booster is 1.0 to 2.25.

9. The liquid laundry additive of claim 3, wherein the cleaning booster is of formula (III)

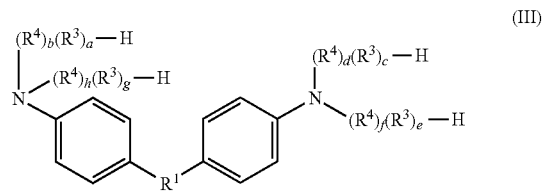

(III)

wherein $R^1$ is a $C_{1-4}$ alkylidene group;
wherein each $R^3$ is a propylene oxide group;
wherein each $R^4$ is an ethylene oxide group;
wherein the sum a+c+e+g is 0 to 200;
wherein the sum b+d+f+h is 0 to 200; and
wherein the sum a+b+c+d+e+f+g+h is 60 to 400.

10. The liquid laundry additive of claim 9, wherein $R^1$ is a methylene group and wherein the cleaning booster has a weight average molecular weight of 4,000 to 9,500 Daltons.

11. A liquid laundry additive, comprising
20 to 80 wt %, based on weight of the liquid laundry additive, of water; and
20 to 80 wt %, based on weight of the liquid laundry additive, of a cleaning booster, wherein the cleaning booster is of formula (I)

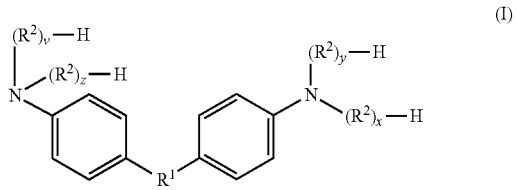

(I)

wherein $R^1$ is a methylene group;

wherein each occurrence of $R^2$ is independently selected from an ethylene oxide group and a propylene oxide group;

wherein the sum v+x+y+z is >40; and wherein the weight ratio of the propylene oxide groups to the ethylene oxide groups in the cleaning booster is 0.25 to 3.

12. The liquid laundry additive of claim 11, wherein the cleaning booster is dispersed in the water.

13. The liquid laundry additive of claim 12, wherein the cleaning booster has a weight average molecular weight of 4,000 to 9,500 Daltons.

14. The liquid laundry additive of claim 13, wherein the weight ratio of the propylene oxide groups to the ethylene oxide groups in the cleaning booster is 1.0 to 2.25.

15. The liquid laundry additive of claim 14, wherein the liquid laundry additive comprises 30 to 75 wt %, based on weight of the liquid laundry additive, of water; and 25 to 70 wt %, based on weight of the liquid laundry additive, of the cleaning booster.

16. The liquid laundry additive of claim 15, wherein the liquid laundry additive comprises 40 to 60 wt %, based on weight of the liquid laundry additive, of water; and 40 to 60 wt %, based on weight of the liquid laundry additive, of the cleaning booster.

\* \* \* \* \*